United States Patent [19]

Horikawa

[11] Patent Number: 4,521,108
[45] Date of Patent: Jun. 4, 1985

[54] FOCUSING DEVICE FOR OPTICAL SYSTEM

[75] Inventor: Yoshiaki Horikawa, Hachiouji, Japan

[73] Assignee: Olympus Optical Co., Ltd., Tokyo, Japan

[21] Appl. No.: 372,374

[22] Filed: Apr. 27, 1982

[30] Foreign Application Priority Data

Apr. 30, 1981 [JP] Japan .................. 56-64065
Apr. 30, 1981 [JP] Japan .................. 56-64066

[51] Int. Cl.³ .................. G01J 1/00; G03B 13/18
[52] U.S. Cl. .................. 356/123; 250/229; 354/79; 354/199
[58] Field of Search ............. 350/502, 507, 512, 538, 350/548, 557, 564, 275, 508, 511; 354/79, 200, 199, 201; 355/55; 356/3, 25, 123; 250/229, 237 R

[56] References Cited

U.S. PATENT DOCUMENTS

| | | | |
|---|---|---|---|
| 3,205,767 | 9/1965 | Weber et al. .................. | 354/79 |
| 3,387,534 | 6/1968 | Barbieri .................. | 355/57 |
| 3,402,637 | 9/1968 | Durst .................. | 355/62 |
| 4,097,881 | 6/1978 | Katagiri .................. | 354/155 |
| 4,238,157 | 12/1980 | Strauch et al. .................. | 354/200 |

FOREIGN PATENT DOCUMENTS 1772891 1/1971 Fed. Rep. of Germany.
54-96653 7/1979 Japan.

Primary Examiner—William H. Punter
Attorney, Agent, or Firm—Cushman, Darby & Cushman

[57] ABSTRACT

A focusing device for optical systems wherein, in order to make it possible to use an image photographing element and to focus an image without vibrating a body, on a light intercepting plate to be rotated in a plane intersecting at right angles with an optical axis around the optical axis in or near an exit pupil or a position conjugate with the exit pupil of an optical system, light intercepting parts and non-light intercepting parts are so arranged as to alternately vary the relative positions of the light intercepting parts and non-light intercepting parts appearing within the pupil whenever the light intercepting plate makes ¼ rotation. The light intercepting plate is rotated either continuously or intermittently by ¼ rotation. The light intercepting parts and non-light intercepting parts appearing within the pupil are alternately varied vertically or horizontally within the visual field.

17 Claims, 22 Drawing Figures

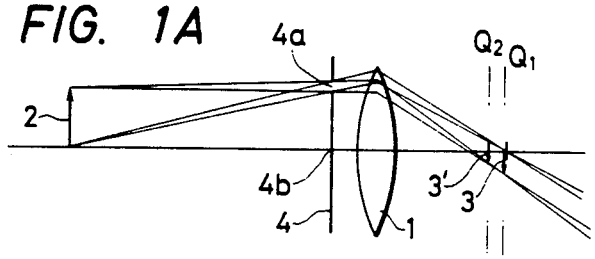
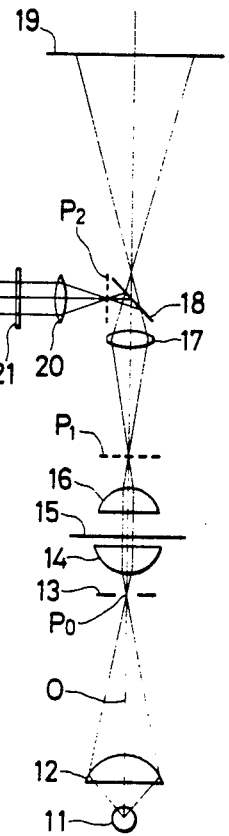
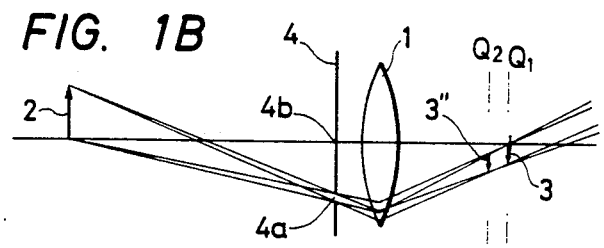
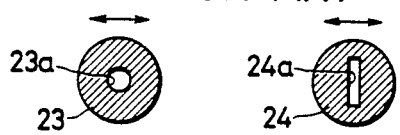
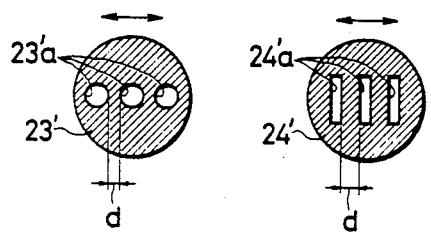

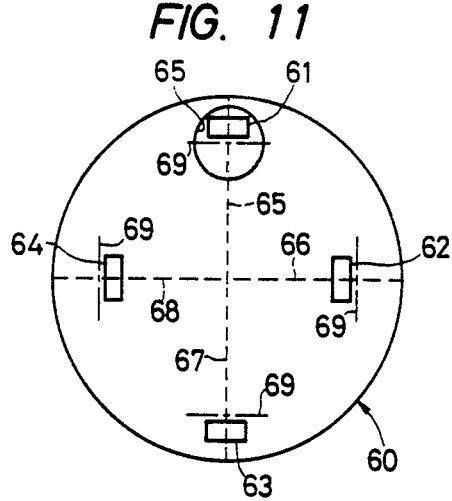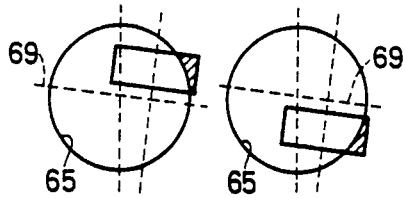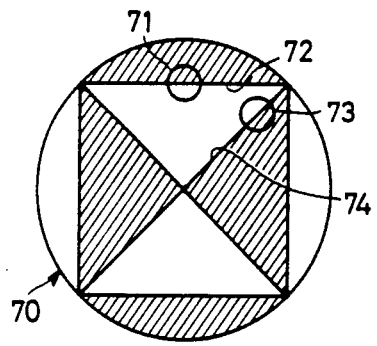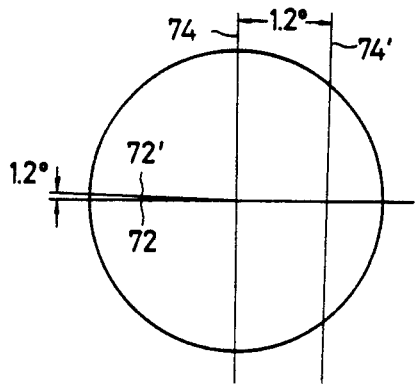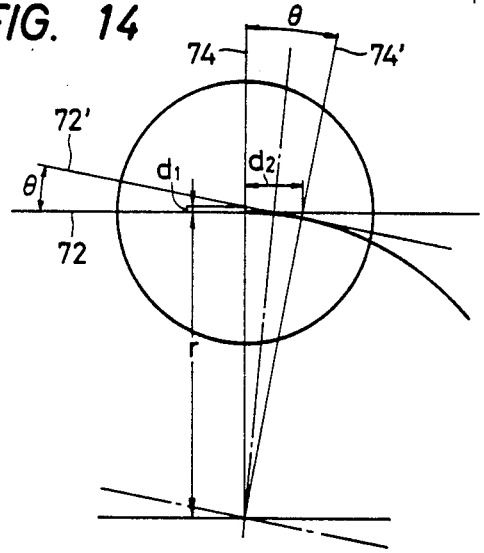

FOCUSING DEVICE FOR OPTICAL SYSTEM

BACKGROUND OF THE INVENTION

1. Field of the Invention

This invention relates to a focusing device adapted to an optical system of such optical instrument as a microscope.

2. Description of the Prior Art

Generally, in a microscope objective, in case the magnification is large, the focal depth will be so deep that, if the objective is focused while observing an object image through an eyepiece, it will be able to be comparatively accurately focused. On the other hand, in the case of an objective of such low magnification as about 4 times, the image side focal depth will be so shallower than of the objective of the large magnification that, even if the image of the object observed through the eyepiece is well observed by the adjusting action of the eye of the observer, it will not be always accurately focused. Therefore, in case it is photographed with a photographing apparatus, no favorable photograph will be obtained and the image will be often de-focused. In order to eliminate such defects, there is a method wherein an auxiliary telescope is added to magnify and focus the image. With such method, the operation is difficult and the precision is hardly improved. Also, there is a focusing method wherein the eye of the observer is vibrated in a plane vertical to the optical axis to find a position in which no parallax with a focusing glass is produced. This method is also so hard to generally practise as not to be recommended.

Further, among the above mentioned methods, a focus detecting device utilizing the principle of the latter is known. Therein, as shown in FIGS. 1A and 1B, a light intercepting plate 4 having a pinhole 4a in front of a lens 1 is so arranged as to be rotatable around an axis 4b and an image 3 of an object 2 is formed through the pinhole 4a. In such case, in a focused plane $Q_1$, the image 3 will be formed in exactly the same position in case the pinhole 4a is positioned above as shown in FIG. 1A and in case the pinhole 4a is positioned below as shown in FIG. 1B but, in a de-focused plane $Q_2$, an image 3' in the case of FIG. 1A and an image 3" in the case of FIG. 1B will be formed in respectively different positions. Therefore, if the image position is adjusted so as not to move even if the light intercepting plate 4 is rotated, the focus of the lens will be correctly adjusted.

FIG. 2 shows an example of an optical system of a microscopic photographing apparatus using such focus detecting device. Therein, the reference numeral 11 denotes a light source, 12 denotes a collector lens, 13 denotes an aperture stop of an illuminating system placed in an exit pupil $P_0$ of the optical system, 14 denotes a condenser lens, 15 denotes a sample, 16 denotes an objective, 17 denotes an eyepiece, 18 denotes a beam splitter, 19 denotes a film surface, 20 denotes a relay lens, 21 denotes a focus mirror and 22 denotes a viewer.

In such microscopic photographing apparatus, a light intercepting plate 23 or 24 having a pinhole 23a or slit 24a shown respectively in FIG. 3A or 3B in or near any of the respective pupil positions $P_0$, $P_1$ and $P_2$ is so arranged that its center (the center of the pinhole or slit) may coincide with the optical axis and is vibrated in the directions indicated by the arrows to focus the image. The light intercepting plate arranged in the pupil position not only has one pinhole or slit but also may be a light intercepting plate 23' or 24' having such plurality of openings arranged in a row as are shown in FIG. 4A or 4B. Further, FIGS. 5A or 5B shows another example of a light intercepting plate in which many pinholes 23"a or slits 24"a (which may be one pinhole or slit) are arranged on the same circle in the peripheral part of a disk 23" or 24", respectively, so that, when this light intercepting plate 23" or 24" is rotated respectively with an axis 23"b or 24"b as a center, the same effect will be obtained. It is necessary that the position of the pinhole 23"a or slit 24"a of this light intercepting plate 23" or 24" should be such that its center will pass through the optical axis O of the optical system when the light intercepting plate is rotated.

In the microscopic photographing apparatus of the above formation, if the light intercepting plate in any of FIGS. 3A to 5B is arranged in the pupil position of the optical system and is vibrated in a plane vertical to the optical axis (when the light intercepting plate 23" or 24" in FIG. 5A or 5B is used, it will be rotated so that the pinhole 23a or 23'a or slit 24a or 24'a will be the same as will be vibrated), when the image is not focused, the image will move and, when it is focused, it will not move. Therefore, it will be observed with the viewer 22 so as to be able to be accurately focused.

Among such conventional focusing devices as are explained above, in the case of the method wherein such light intercepting plate as is shown in FIGS. 3A to 4B is vibrated, detrimental vibrations will be caused to the optical system by the vibration of the light intercepting plate. Therefore, it is not desirable. Also, in the case of the method wherein such light intersecting plate as is shown in FIGS. 5A and 5B is rotated, no problem of the vibrations will be caused but, as the light intercepting plate will be always rotating, it will not be stationary and therefore no image information as the light is intercepted will be able to be obtained with the image photographing element. That is to say, while the image is being sampled with the image photographing element, the image will vary. It is not desirable.

SUMMARY OF THE INVENTION

Therefore, a primary object of the present invention is to provide a focusing device wherein, in order to give no detrimental vibration to an optical system, a light intercepting plate which can be rotated around the optical axis in or near an exit pupil or a conjugate position with the exit pupil of the optical system is used so that, when focused, an object image will be seen as stationary and an information will be able to be obtained with an image photographing element.

According to the present invention, this object is attained by arranging light transmitting parts which can pass a light and light intercepting parts which can intercept a light on a light intercepting plate so that, while the light intercepting plate makes one rotation, the relative positions of the first part passing the light and the second part intercepting the light to appear in the pupil will be able to periodically vary at intervals of some time.

According to a preferred formation of the present invention, a light intercepting plate is sectioned into a plurality of sections having equal areas and each including a set of a light transmitting part and a light intercepting part and the boundary line between the light transmitting part and light intercepting part is positioned on a periphery concentric with the rotation center of the light intercepting plate or on a concentric periphery of a different radius. The light intercepting plate may be rotated continuously or intermittently so that no detrimental vibration will be caused to the optical system and the image information will be able to be obtained with an image photographing element.

According to another preferred formation of the present invention, the paired light transmitting parts are of shapes identical with each other and are arranged in positions symmetrical with respect to the rotation axis of the light intercepting plate. Further, the paired light transmitting parts are arranged along a line segment coinciding with the diameter of the light intercepting plate or along a line segment intersecting at right angles with the line segment coinciding with the diameter of the light intercepting plate so that, in case the light intercepting plate is rotated intermittently, even if there is an error in each angle of rotation, the focusing will be possible at a high precision.

BRIEF DESCRIPTION OF THE DRAWINGS

FIGS. 1A and 1B are views showing a focus detecting principle;

FIG. 2 is a view showing a microscope optical system as an example of an optical system for which a focus detecting device is used;

FIGS. 3A to 5B are views each showing a shape of a light intercepting plate used for a conventional focus detecting device;

FIG. 11 is a view showing another further embodiment of a light intercepting plate according to the present invention;

FIGS. 12A and 12B are views each showing the relation between the light transmitting part and pupil in case there is an error in the angle of rotation of the light intercepting plate shown in FIG. 11;

FIG. 13 is a view showing another further embodiment of a light intercepting plate according to the present invention; and FIGS. 14 and 15 are views each for explaining the relation between the light transmitting part and pupil in case there is an error in the angle of rotation of the light intercepting plate shown in FIG. 13.

DESCRIPTION OF THE PREFERRED EMBODIMENTS

Figure 6:
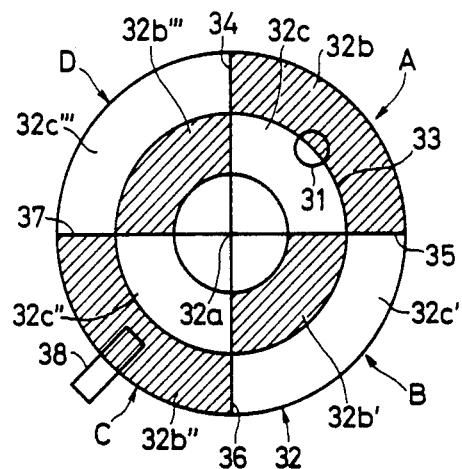
FIG. 6 is a view showing an embodiment of a light intercepting plate according to the present invention.

FIG. 6 shows an embodiment of a light intercepting plate according to the present invention. A light transmitting part 32c and light intercepting part 32b are formed with a line 33 as a boundary so as to divide a pupil 31 with the line 33 forming a periphery with the rotation center 32a of a light intercepting plate 32 as a center and further light transmitting parts and light intercepting parts are arranged alternately respectively in sections A, B, C and D sectioned with lines 34, 35, 36 and 37 dividing the light intercepting plate 32 into four sections. That is to say, the section A has the light intercepting part 32b outside and the light transmitting part 32c inside with the line 33 as a boundary, the section B has the light transmitting part 32c' outside and the light intercepting part 32b' inside, the section C has the light intercepting part 32b'' outside and the light transmitting part 32c'' inside and the section D has the light transmitting part 32c''' outside and the light intercepting part 32b''' inside respectively arranged.

If such light intercepting plate 32 is arranged in or near any of the pupils $P_0$, $P_1$ and $P_2$ of the microscope optical system shown, for example, in FIG. 2 with the rotation center 32a positioned so that the center of the pupil 31 coincides with the optical axis O, as the image will vibrate in a de-focused position, a focused position will be able to be determined by finding a position in which the image will not vibrate. In case such light intercepting plate is used, while the light intercepting plate rotates by 90 degrees in FIG. 6, the part in which the light is intercepted of the pupil will not vary, therefore there will be a time for obtaining an image information with an image photographing element and, further, as the rotation is in one direction, no detrimental vibration will be caused to the microscope body. When such sensor as a photointerrupter is placed in the position indicated by the reference numeral 38 in FIG. 6, the position information of the rotating light intercepting plate will be obtained by using the variations of the brightness of the parts indicated by the reference numerals 34, 35, 36 and 37 and it will be convenient for determining the time for the start of the scanning of the image photographing element in the case of photographing the image.

Figure 7:
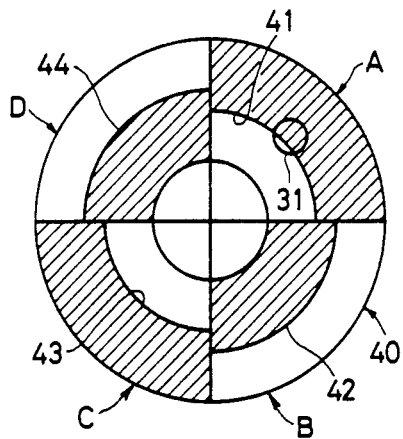
FIG. 7 is a view showing another embodiment of a light intercepting plate according to the present invention.

FIG. 7 is a view showing another embodiment of a light nintercepting plate according to the present invention. In this embodiment, in a light intercepting plate 40, lines 41, 42, 43 and 44 of the boundaries between the light intercepting parts and light transmitting parts in the respective sections A, B, C and D are alternately displaced in the respective sections. Therefore, in the pupil, the area occupied by the light transmitting part is small and the area occupied by the light intercepting part is large. In case this light intercepting plate 40 is used, the area occupied by the light transmitting part in the pupil will be so small that the amount of the transmitted light will be smaller than by the light intercepting plate 32 in FIG. 6. However, as the light does not pass through the center part of the pupil 31 but passes through the edge part of the pupil 31 as shown in FIG. 7, the sensitivity to de-focusing is higher in the light intercepting plate 40.

Figure 8:
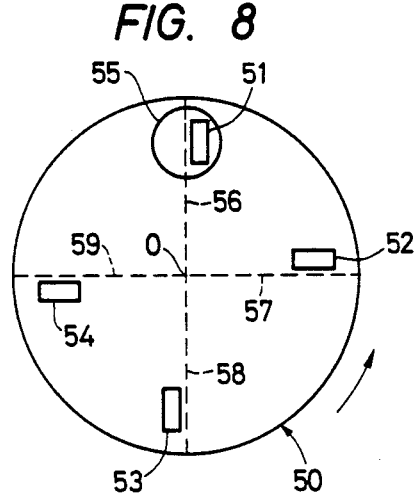
FIG. 8 is a view showing another further embodiment of a light intercepting plate according to the present invention.
Figures 9A, 9B:
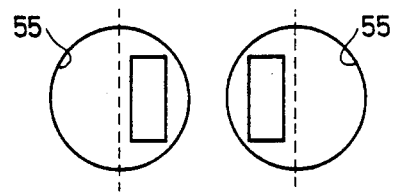
FIGS. 9A and 9B are views each showing the movement of the light transmitting part in case the light intercepting plate shown in FIG. 8 is used.
Figures 10A, 10B:
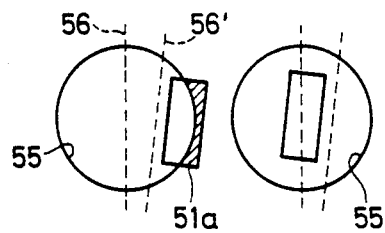
FIGS. 10A and 10B are views each showing the relation between the light transmitting part and pupil in case there is an error in the angle of rotation of the light intercepting plate shown in FIG. 8.

FIG. 8 shows still another embodiment of the present invention. In this embodiment, four light transmitting parts 51, 52, 53 and 54 are formed in a light intercepting plate 50. When lines 56, 57, 58 and 59 dividing the light intercepting plate 50 into four sections are considered, the light transmitting part 51 will be arranged to the right of the line 56, the light transmitting part 52 will be arranged above the line 57, the light transmitting part 53 will be arranged to the left of the line 58 and the light transmitting part 54 will be arranged below the line 59. Therefore, when a pupil 55 is arranged to be in the illustrated position and the light intercepting plate 50 is rotated stepwise by 90 degrees in the direction indicated by the arrow, first the light transmitting part 52 will move to the position of the pupil 55 and will be positioned on the left side within the pupil 55. When the light intercepting plate 50 is then further rotated by 90 degrees, the light transmitting part 53 will come to the position of the pupil 55 and will be positioned on the right side within the pupil 55. When the light intercepting plate 50 is thus rotated stepwise at intervals of 90 degrees, the position of the light transmitting part appearing in the pupil will move from the position shown in FIG. 9A to the position shown in FIG. 9B and further, from the position shown in FIG. 9B to the position shown in FIG. 9A. That is to say, the first parts which can pass the light will move alternately to the positions symmetrical with respect to the line segments 56, 58 or 57, 59 in the diametral direction of the light intercepting plate 50 dividing the pupil into two parts within the pupil and will be just the same as vibrating to the right and left. And therefore, the focusing will be possible as already explained in the conventional example. Further, as the light transmitting parts will be stationary between the movements of the light intercepting plate 50, the image will be able to be sampled at this time with the image photographing element 38 (See FIG. 6). In the focusing device using such light intercepting plate 50, in the case of detecting the focus with the image photographing element, it will be desirable that the amount of the received light had better be large. For that purpose, the light transmitting parts 51, 52, 53 and 54 of the light intercepting plate 50 had better be large. However, if the area of the light transmitting part is large, in case there is an error in the angle of rotation of the light intercepting plate, the amount of the light passing through the light transmitting part will be different in the right and left positions within the pupil. That is to say, as shown in FIGS. 10A and 10B, if there is an error in the angle of rotation of the light intercepting plate 50 and the dividing line 56 deviates to 56′, as shown in FIG. 10A, a part 51a of the light transmitting part 51 will deviate from the pupil 55 and no light will come to the part 51a. Therefore, in the cases of FIGS. 10A and 10B, the amount of the light entering the image photographing element will be so different as to cause a mis-operation.

FIG. 11 shows still another embodiment of a light intercepting plate according to the present invention made to eliminate the above defects. In this embodiment, respective light transmitting parts 61, 62, 63 and 64 are arranged on quadrisectors 65, 66, 67 and 68 and are provided alternately symmetrically outside and inside a bisector 69. In case such light intercepting plate 60 is used, when an error is produced in the angle of rotation, the relative positions of the light transmitting part and pupil 65 will be as shown in FIGS. 12A and 12B. In such case, as the displacement of the light transmitting part within the pupil 65 will be in the same direction, even if a part to which no light comes is produced and the amount of the transmitted light reduces to be smaller than in the normal state, in the cases of FIGS. 12A and 12B, it will reduce by the same amount, therefore the light amount will be equal and no mis-operation will be caused.

FIG. 13 shows another further embodiment of a light intercepting plate according to the present invention. The area of the light intercepting plate which covers the pupil 71 is divided into the light transmitting part and light intercepting part by the respective side 72 of a polygon inscribing a circle which has a center which coincides with the rotational center of the plate. In this embodiment, there are considered a case (first method) that the pupil is so formed as to come to a position 71 (a line 72 becomes a bisector of the pupil) and a case (second method) that the pupil is so formed as to come to a position 73 (a line 74 becomes a bisector of the pupil). In either case, the same as in the case of the other embodiments, a light intercepting plate 70 is intermittently rotated by 90 degrees with a stepping motor or the like. That is to say, in the case of the first method, when rotated, the light transmitting parts will vary in turn in the position so as to be symmetrical with respect to the bisector of the pupil extending in the direction perpendicular to the radial direction of the light intercepting plate 70. In the case of the second method, the light transmitting parts will vary so as to be symmetrical with respect to the bisector of the pupil in the diametral direction of the light intercepting plate 70. In case this light intercepting plate 70 is used, if there is an error in the angle of rotation, as shown in FIG. 14, if the distance between the optical axis of the pupil and the rotation center of the light intercepting plate 70 when the dividing line deviates by an angle $\theta$ is represented by r and the amount of the deviation in the normal direction from the boundary line of the division at the time of the correct rotation is represented by $d_1$ in the case of the first method and $d_2$ in the case of the second method, the amounts $d_1$ and $d_2$ of the deviation will be able to be represented as follows:

$d_2 = r \tan \theta$ and $d_1 = d_2 \tan \theta/2$

As understood from these formulae, $d_1$ is smaller than $d_2$. In case the light intercepting plate 70 is rotated with a stepping motor rotating, for example, by 60 degrees, if the error of the angle of rotation is 2%, that is, the angle of deviation is 1.2 degrees and r=15 mm., $d_2$=0.3 mm and $d_1$=0.003 mm. FIG. 15 is a view showing the manner in such case. In the second method, the difference between the light amount variations in the case of intercepting the light in the right half of the pupil and in the case of intercepting the light in the left half of the pupil is so large that it is difficult to obtain the information with the image photographing element. However, in the first method, the error is so small that the information can be obtained from the image photographing element.

It is a further aspect of the present invention that the light intercepting plate may be intermittently rotated by a portion of a full 360° rotation represented by 1/Ni. Using this formula, Ni is representative of the total number of sections which the light intercepting plate has been divided into. Alternatively, Ni may be representative of the number of light transmitting parts which have been established for the eight intercepting plate. Also, the light transmitting parts may be of the same shape and arranged in positions symmetrically with respect to the rotation axis of the light intercepting plate. The light transmitting parts may also be arranged along a line segment which coincides with the diameter of the light intercepting plate, or they may be arranged along the line segment intersecting at right angles with a line segment which coincides with the diameter of the light intercepting plate.

All of the foregoing is intended to set forth exemplary preferred embodiments, and not to limit the present invention, which is defined only by the following claims.

I claim:

1. A focusing device for an optical system, comprising:
a light intercepting plate, having a rotational center which is not co-axial with an exit pupil of said optical system, arranged rotatably in a plane perpendicular to an optical axis of said optical system, said plate being near said exit pupil of said optical system, and said plate having a plurality of light transmitting parts and light intercepting parts arranged so that a first part which can pass light and a second part which can intercept light both appear in said pupil, wherein said light transmitting parts and light intercepting parts are so arranged that rotation of said plate by 360° causes the relative axial position of said first part and second part in said pupil to alternate periodically at predetermined interval during said rotation.

2. A focusing device according to claim 1, wherein said plate further includes boundary lines between said light transmitting parts and light intercepting parts positioned on a periphery concentric with said rotational center of said plate.

3. A focusing device according to either claim 1 or 2, wherein:
said light intercepting plate is sectioned into a plurality of sections having equal areas, each of said sections including a set of said light transmitting part and light intercepting part.

4. A focusing device according to claim 1, wherein:
said light interecting plate is sectioned into a plurality of sections having equal areas, each of said sections including a set of said light transmitting part and light intercepting part, with respective boundary lines between said light transmitting parts and light intercepting parts included respectively in two sections adjacent to each other being positioned respectively on peripheries concentric with the rotation center of said light intercepting plate with different radii from each other.

5. A focusing device according to claim 3, wherein: said light intercepting plate is intermittently rotated by 1/Ni of a full rotation, where Ni represents the total number of said sections.

6. A focusing device according to claim 1, wherein: said light transmitting parts are of the same shape and are arranged in positions symmetrical with respect to said rotational center of said plate.

7. A focusing device according to claim 6, wherein: said light transmitting parts are arranged along a line segment coinciding with the diameter of said light intercepting plate.

8. A focusing device according to claim 6, wherein: said light transmitting parts are arranged along a line segment intersecting at right angles with a line segment coinciding with the diameter of said light intercepting plate.

9. A focusing device according to either claim 7 or 8, wherein:
said light intercepting plate is intermittently rotated by 1/Ni of a full rotation, where Ni represents the total number of said light transmitting parts.

10. A focusing device according to either claim 1 or 2, said focusing device further comprising:
an image photographing element arranged adjacent to said light intercepting plate to receive light passing through said light transmitting parts.

11. A focusing device according to claim 4, wherein: said light intercepting plate is intermittently rotated by 90 degrees.

12. A focusing device according to claim 7 or 8, said focusing device further comprising:
an image photographing element arranged adjacent to said light intercepting plate to receive light passing through said light transmitting parts.

13. A focusing device according to claim 1, wherein: an area of said light intercepting plate covering said pupil is divided into said light transmitting part and light intercepting part by line segments passing through said rotation center of said light intercepting plate, said segments dividing the plate into a plurality of sections having equal areas.

14. A focusing device according to claim 1, wherein: an area of said light intercepting plate covering said pupil is divided into said light transmitting part and said light intercepting part by the respective side of a polygon inscribing a circle having a center coinciding with said rotational center of said plate.

15. A focusing device according to either claim 13 or 14, wherein:
said light intercepting plate is intermittently rotated by 90 degrees.

16. A focusing device according to either claim 13 or 14, wherein:
said light intercepting plate is intermittently rotated by 60 degrees.

17. A focusing device according to either claim 13 or 14, said focusing device further comprising:
an image photographing element arranged adjacent to said light intercepting plate to receive light passing through said light transmitting parts.

* * * * *